Jan. 16, 1951  J. MARCO  2,538,466
REACTOR FOR HOMOGENIZING MACHINES
Filed May 3, 1949  9 Sheets-Sheet 4
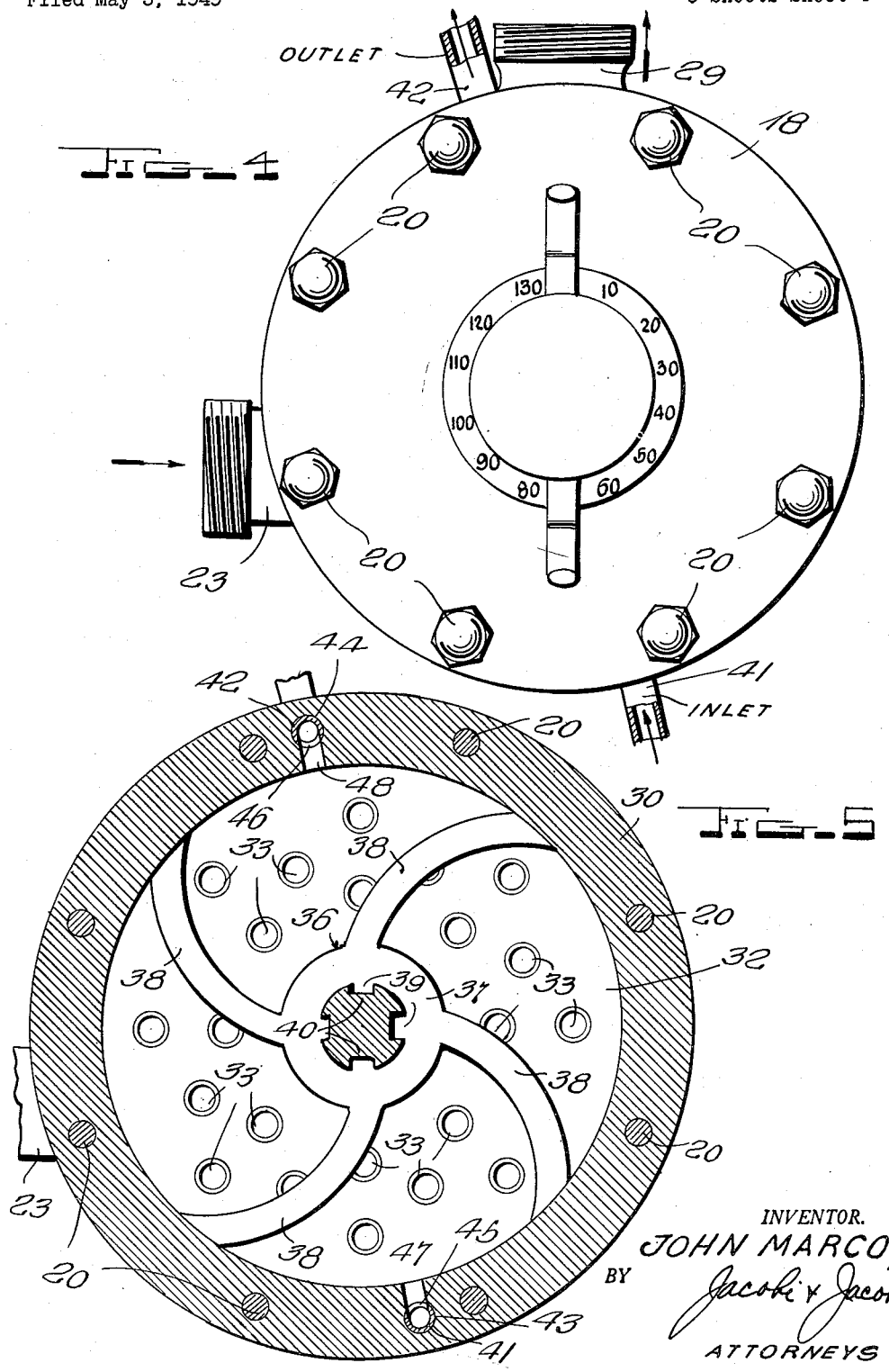
INVENTOR.
JOHN MARCO,
BY
Jacobi & Jacobi
ATTORNEYS Jan. 16, 1951 J. MARCO 2,538,466
REACTOR FOR HOMOGENIZING MACHINES
Filed May 3, 1949 9 Sheets-Sheet 5
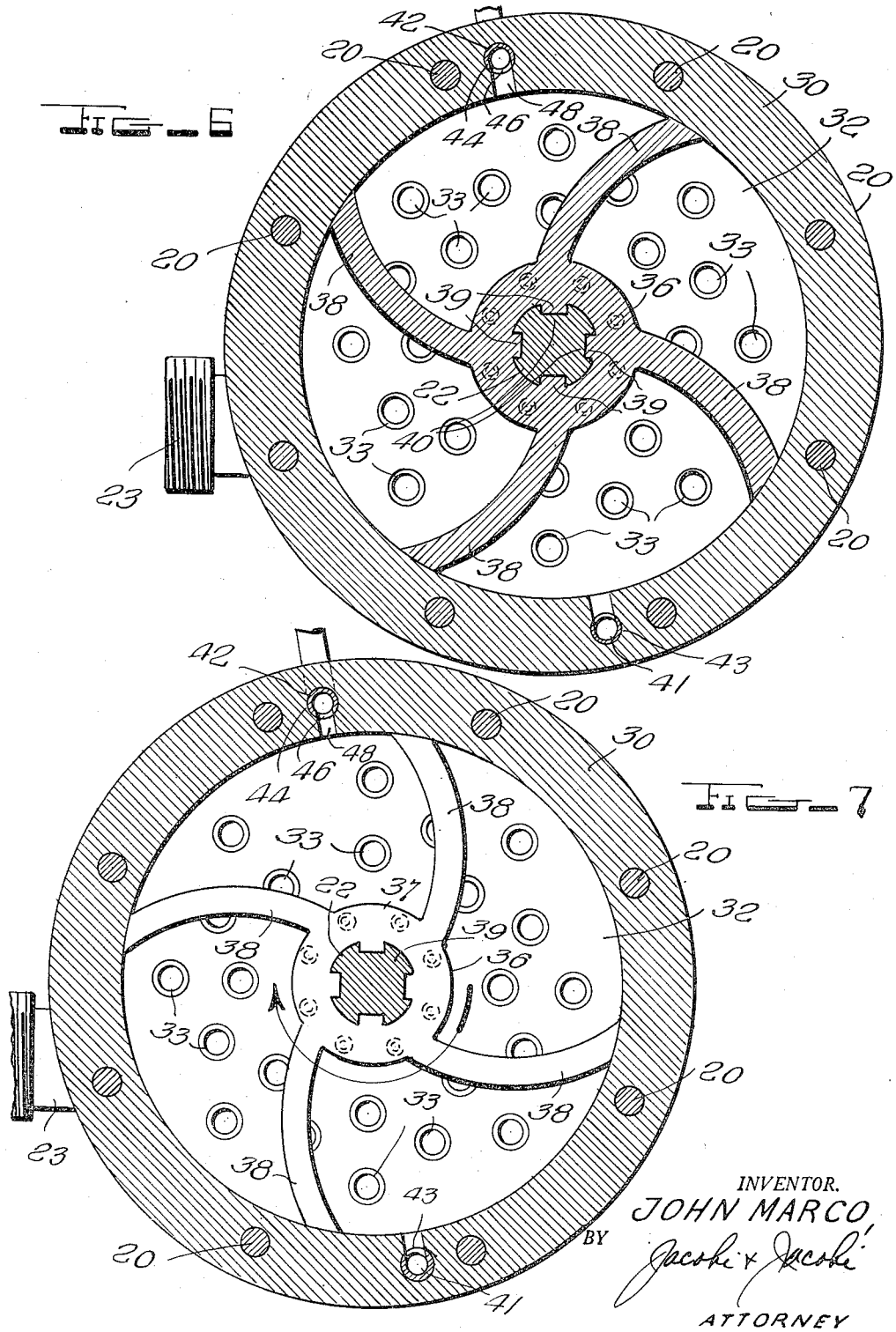
INVENTOR.
JOHN MARCO
BY Jacobi & Jacobi
ATTORNEY

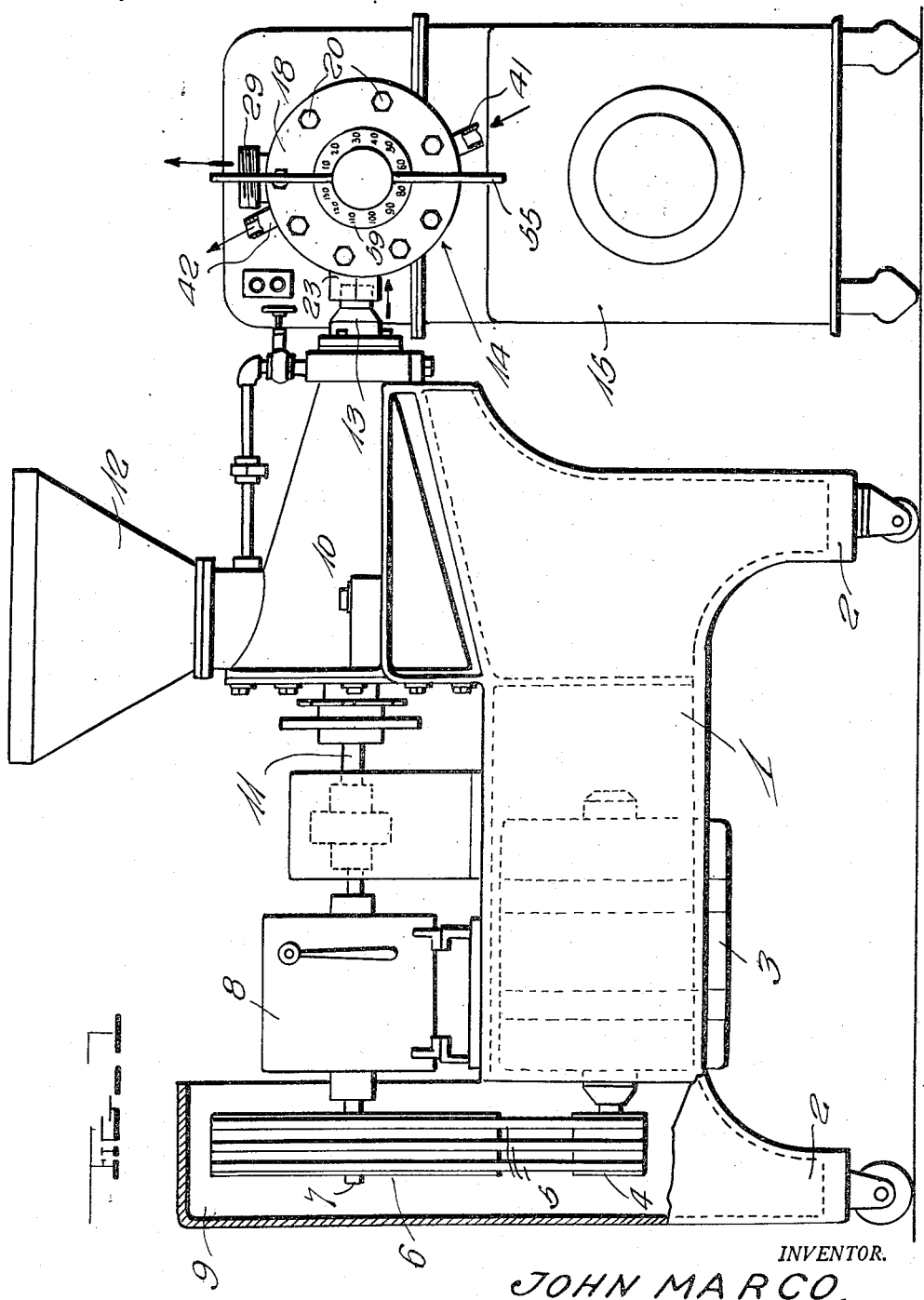

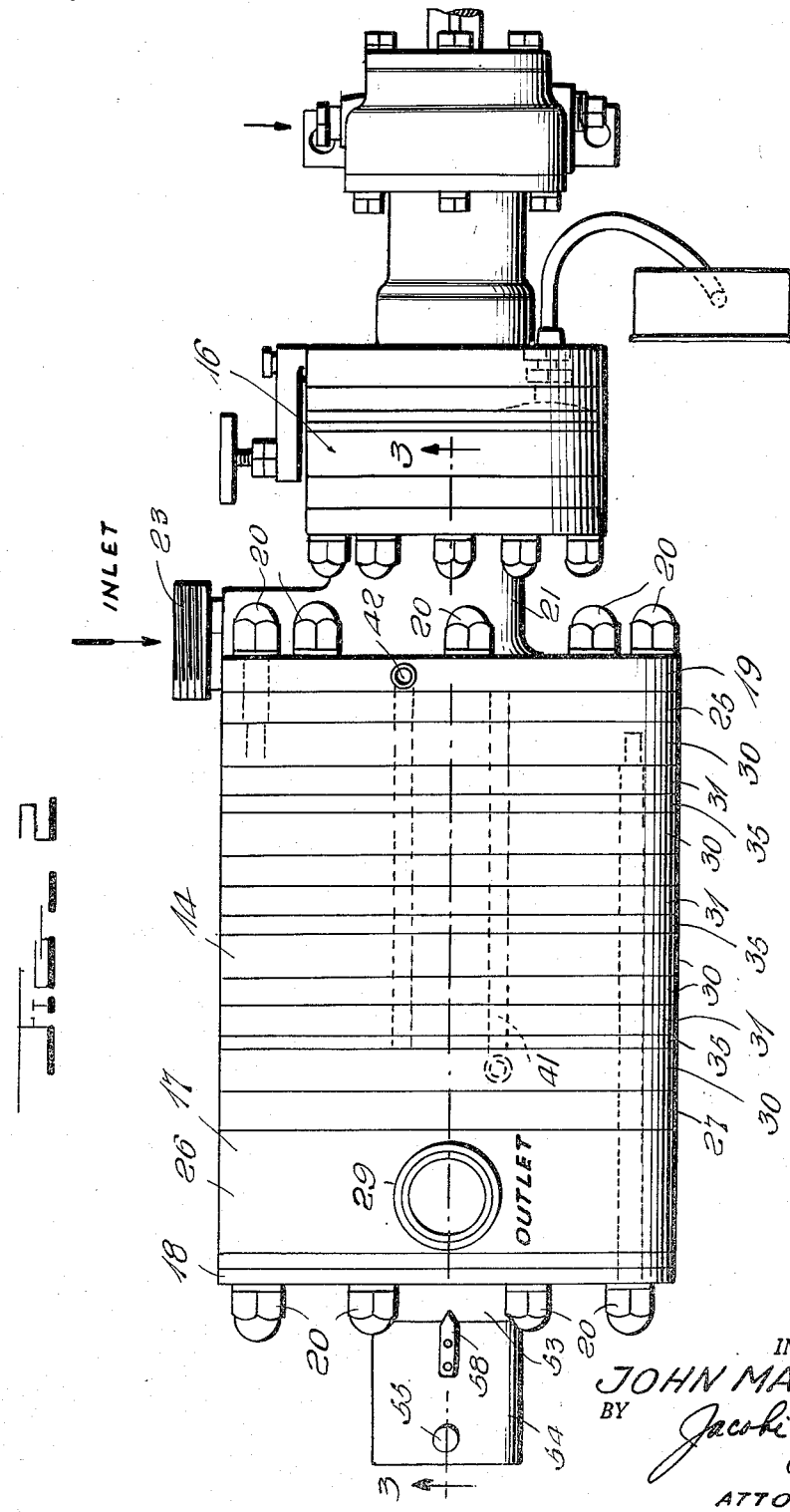

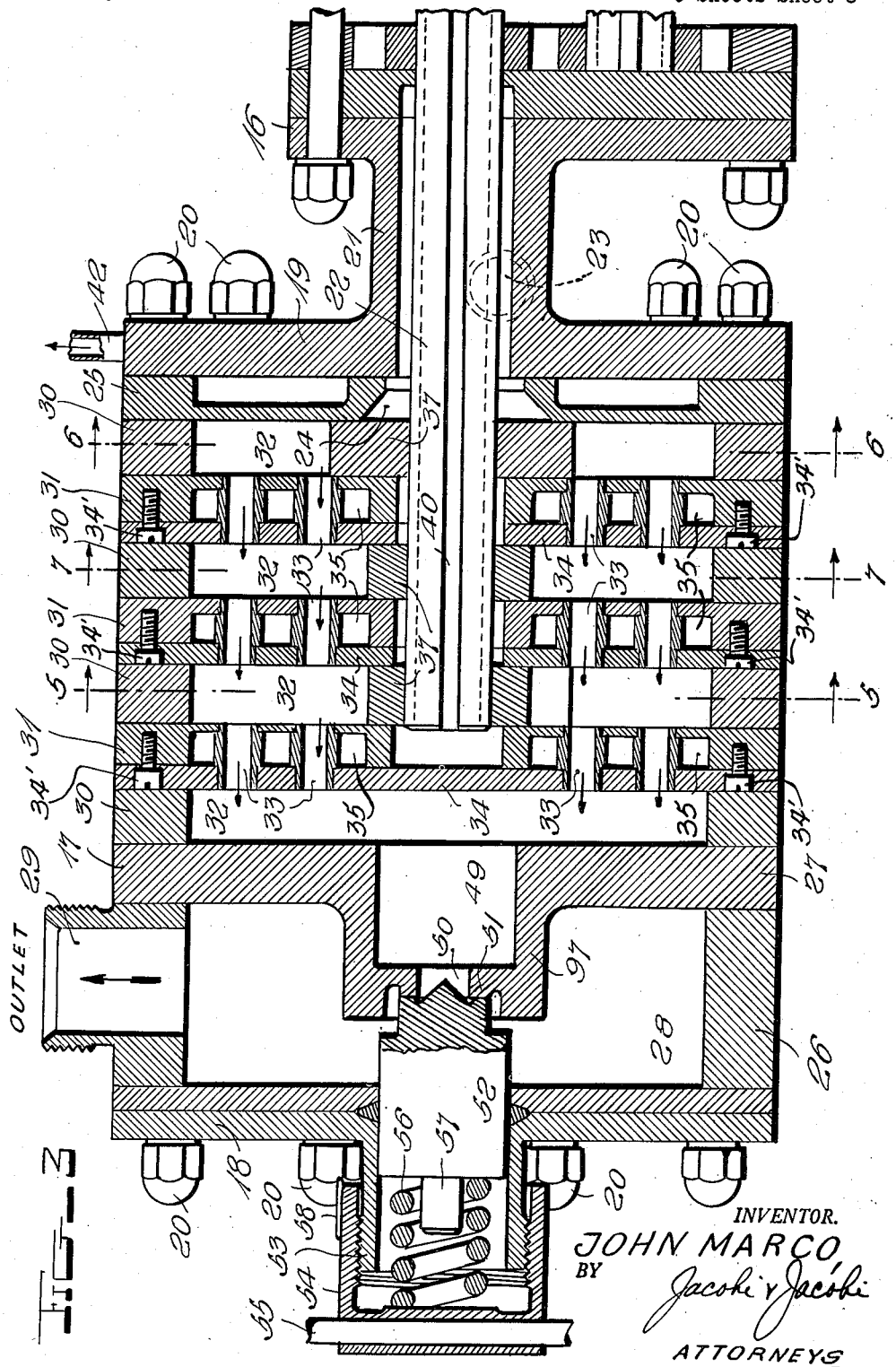

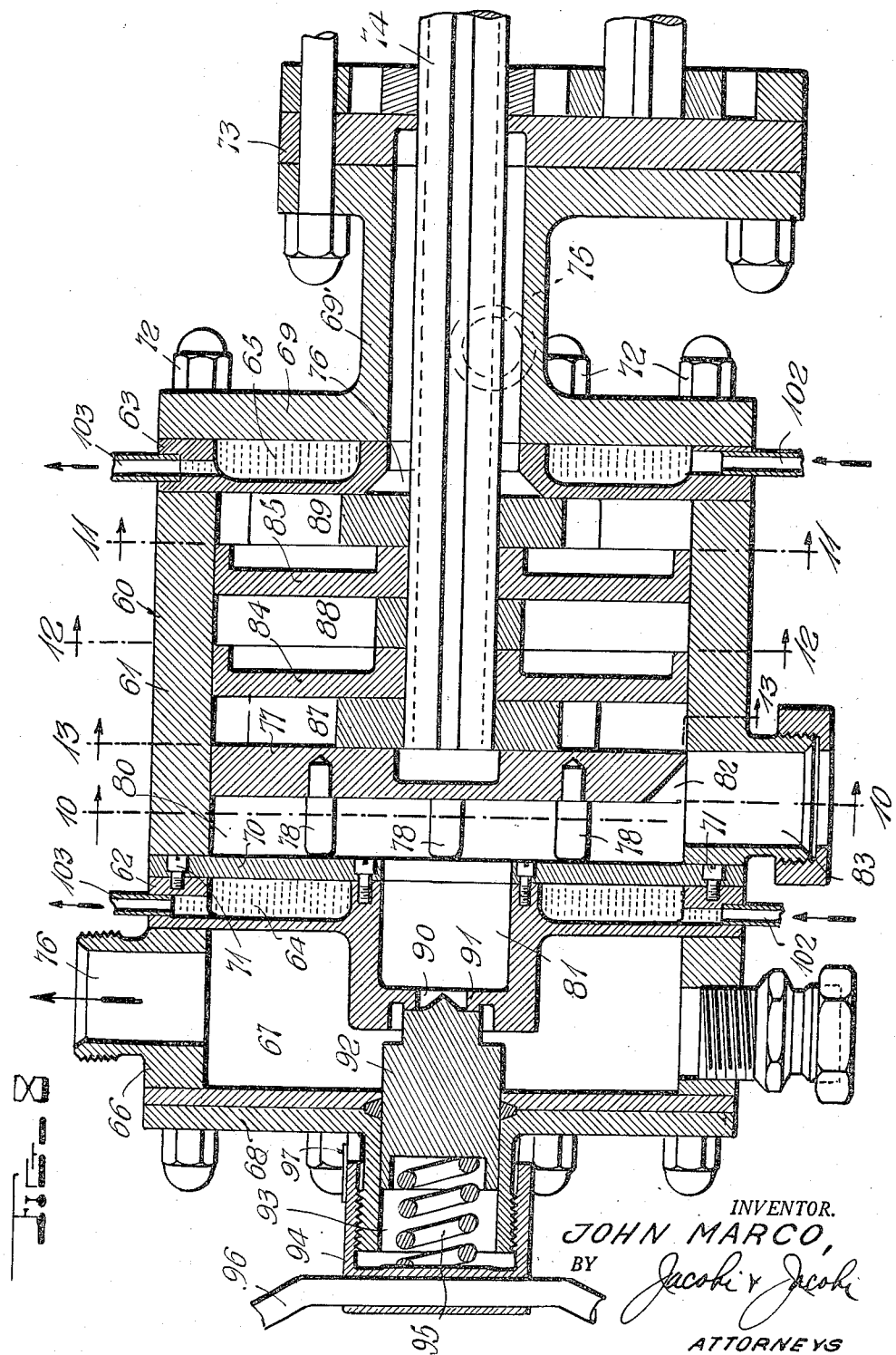

Jan. 16, 1951 J. MARCO 2,538,466
REACTOR FOR HOMOGENIZING MACHINES
Filed May 3, 1949 9 Sheets-Sheet 7
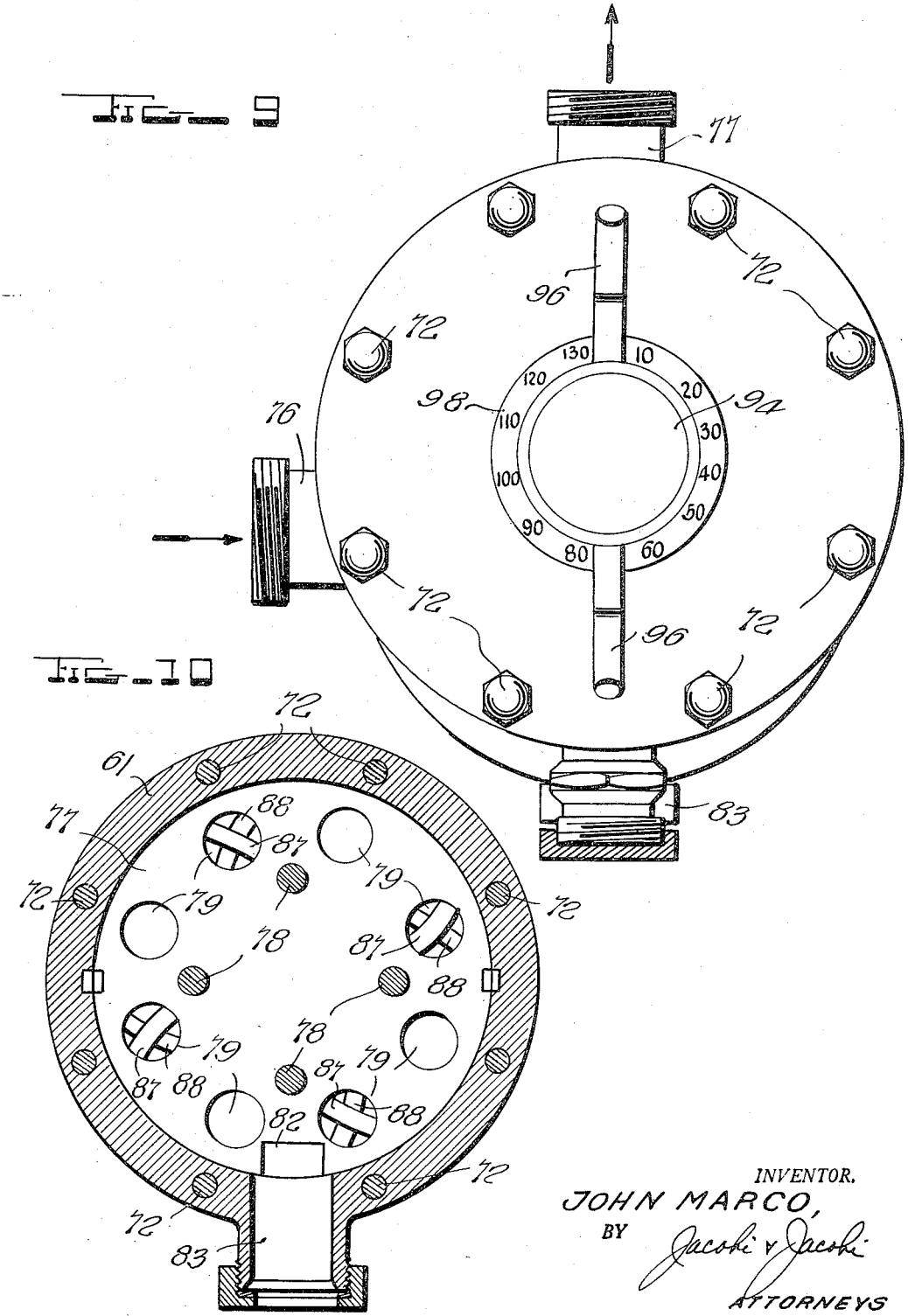
INVENTOR.
JOHN MARCO,
BY Jacobi & Jacobi
ATTORNEYS

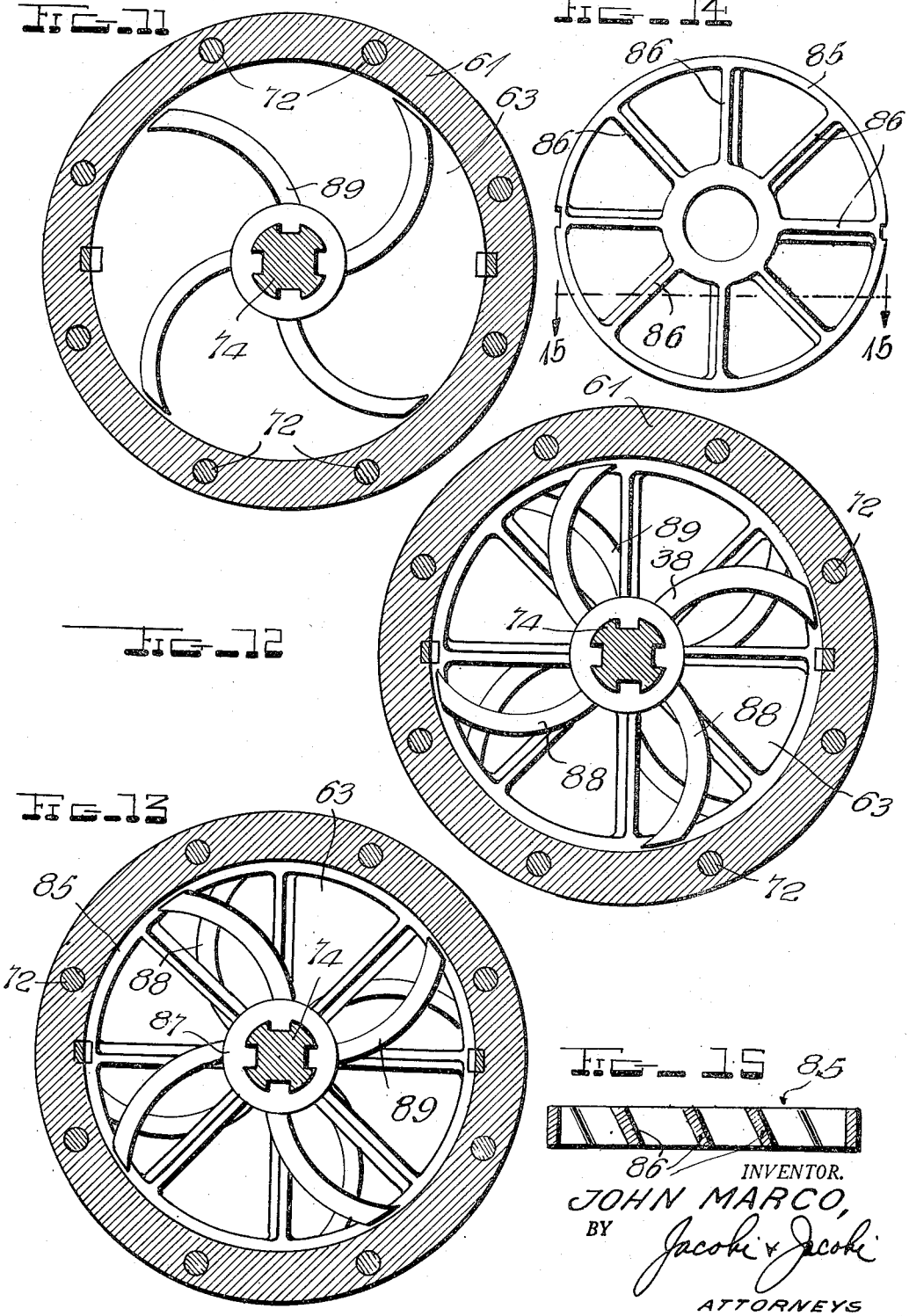

Jan. 16, 1951  J. MARCO  2,538,466
REACTOR FOR HOMOGENIZING MACHINES
Filed May 3, 1949  9 Sheets-Sheet 9
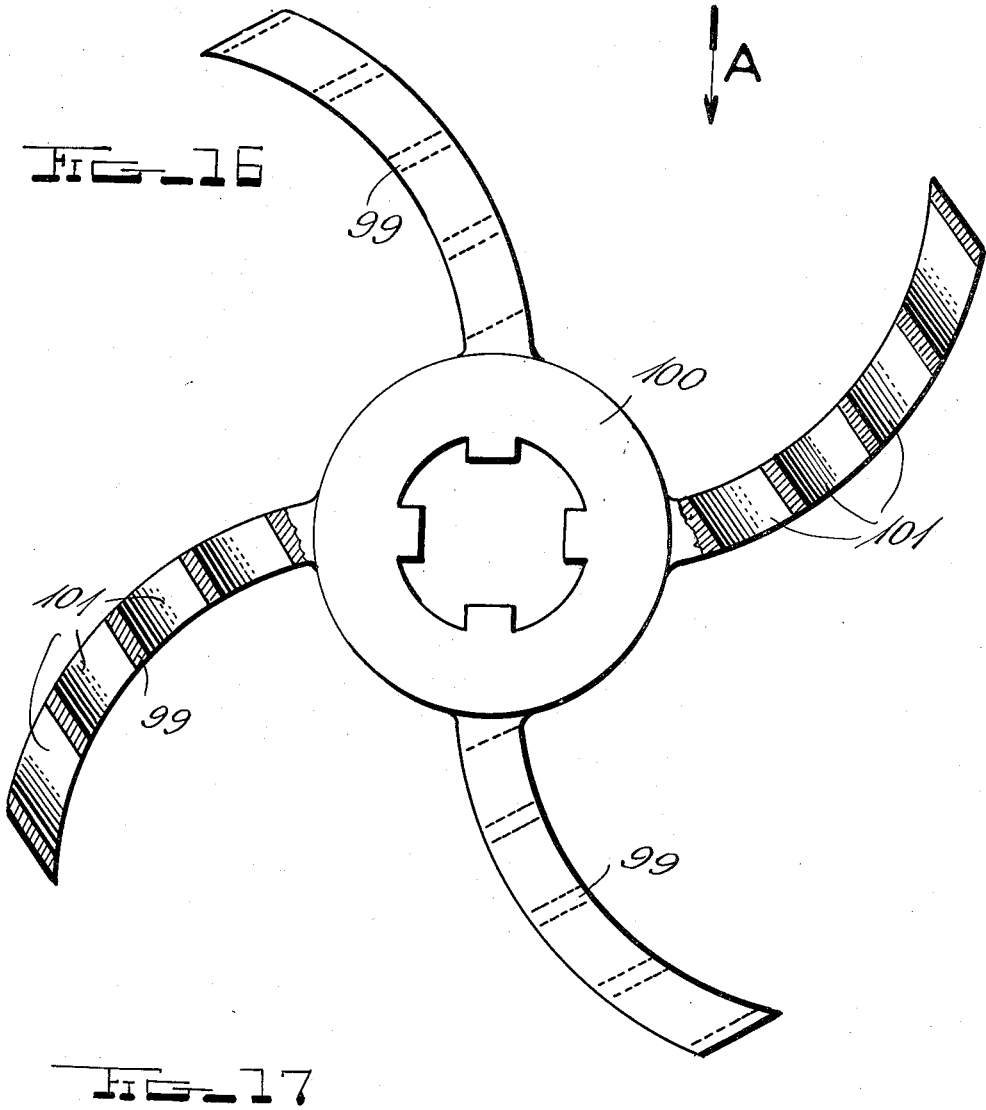
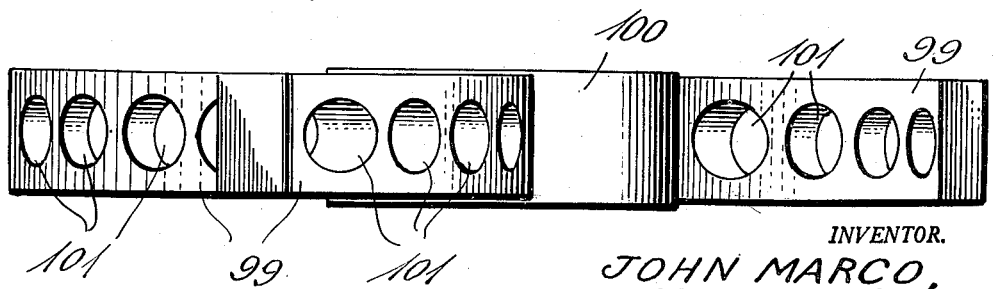
INVENTOR.
JOHN MARCO,
BY Jacobi & Jacobi
ATTORNEYS Patented Jan. 16, 1951

2,538,466

UNITED STATES PATENT OFFICE 2,538,466

REACTOR FOR HOMOGENIZING MACHINES

John Marco, Wilmington, Del.

Application May 3, 1949, Serial No. 91,202

7 Claims. (Cl. 259—9)

This invention relates to homogenizing machines and more particularly to a reactor constituting an element of such a machine, it being one object of the invention to provide a reactor through which passes material to be homogenized and wherein the material is subjected to repeated beating actions and also to cooling or heating so that the temperature of the material may be gradually cooled or heated according to whether low or high temperature is desired for material emitted from the reactor.

Another object of the invention is to provide a reactor through which material is forced by a pump and treated by action of impellers or beaters which turn with a shaft and are located in spaces or chambers into which the reactor body is divided by partitions which are hollow and carry transversely extending tubes so that as the material is forced through the tubes from one chamber to another the material may be cooled or heated by action of a refrigerant or heating medium flowing through the hollow partitions.

Another object of the invention is to provide a reactor having one end connected with a pump casing by a neck of such dimensions that material may flow through the neck about a pump shaft and thus allow the neck to serve as a conduit for the material as well as a connection between the pump and the reactor.

Another object of the invention is to provide a reactor which has a casing or body formed of sections which are firmly secured against each other and of such formation that a reactor of predetermined size may be built by using a suitable number of sections.

Another object of the invention is to provide a reactor having at one end an outlet chamber into which material enters by way of a homogenizing valve so mounted and so formed that pressure exerted by a spring to seat the valve may be controlled and a record made of the spring pressure so that exact setting of the valve may be obtained in order to duplicate the material delivered from the reactor at a future date.

Another object of the invention is to provide a reactor which is of simplified construction and may be very easily taken apart for thorough cleaning and sterilizing when necessary.

With these and other objects in view, the invention consists of an improved construction and arrangement of parts illustrated in the accompanying drawings wherein:

Figure 1 is a side view of a homogenizing machine including the improved reactor as one of its elements;

Figure 2 is a top plan view of the reactor;

Figure 3 is a sectional view taken longitudinally through the reactor along the line 3—3 of Figure 2;

Figure 4 is a view looking at the front end of the reactor;

Figure 5 is a transverse sectional view taken along the line 5—5 of Figure 3;

Figure 6 is a transverse sectional view taken along the line 6—6 of Figure 3;

Figure 7 is a transverse sectional view taken along the line 7—7 of Figure 3;

Figure 8 is a sectional view taken longitudinally through a reactor of modified construction;

Figure 9 is a view looking at the front end of a reactor shown in Figure 8;

Figure 10 is a transverse sectional view taken along the line 10—10 of Figure 8;

Figure 11 is a sectional view taken along the line 11—11 of Figure 8;

Figure 12 is a sectional view taken along the line 12—12 of Figure 8;

Figure 13 is a sectional view taken along the line 13—13 of Figure 8;

Figure 14 is a view in elevation of one of the partitions between which beaters or impellers operate;

Figure 15 is a sectional view taken along the line 15—15 of Figure 14;

Figure 16 is a view upon an enlarged scale showing a beater principally in elevation and partially in section; and, Figure 17 is an edge view of the beater shown in Figure 16.

The homogenizing machine shown in Figure 1 has a body 1 supported by front and rear legs 2 at its ends. This body is hollow and carries a motor 3 having on its shaft a pulley 4 about which are trained belts 5. These belts are also trained about a larger pulley 6 carried by the shaft 7 projecting from a gear box 8 mounted over the rear end of the body, the pulleys and the belts being enclosed by a shield 9. A rotary feed continuous mixer 10, constructed as shown in my copending application Serial No. 91,201, filed May 3, 1949, is mounted over the forward end portion of the body and contains mechanism to which movement is imparted from the gearing in the box 8 by mechanism including a shaft 11. Material to be treated is deposited in a hopper 12 from which it flows into the mixer 10 and wherein the material is mixed, the mixture being discharged from the mixer through its outlet spout 13. The construction of the continuous mixer and its feed mechanism has not been specifically illustrated as they constitute the subject matter of another application referred to above. Any material desired may be deposited in the hopper provided it is of such a nature that it may be mixed with other substances and subject to action of the reactor with which the outlet 13 is connected and also to a homogenizing action.

The improved reactor 14 constituting the subject matter of this invention is mounted upon a support 15 together with a pump 16. This reactor has a cylindrical casing or body 17 closed at its front and rear ends by heads 18 and 19 and formed from a plurality of sections which are secured in close fitting engagement with each other by bolts or tie rods 20. The rear head 19 is connected with the pump 16 by a tubular neck 21 through which a shaft 22 driven by the pump passes, the internal diameter of the neck being such that when the nozzle 13 of the mixer is connected with the inlet 23 leading laterally from the neck the material may flow through the pump from which same flows along the shaft and into a pocket 24 formed centrally of the section 25 of the casing. The construction of the pump has not been shown in detail as it is fully illustrated and described in Patent No. 2,321,609. At the front end of the casing is a section 26 which cooperates with section 27 to form a chamber 28 from which an outlet 29 projects and between the sections 25 and 27 are alternately disposed sections 30 and 31, the sections 30 constituting marginal walls of chambers 32 and the sections 31 serving as partitions which separate the chambers 30 from each other. Communication between the chambers 32 is established by means of tubes 33 mounted transversely through the sections or partitions 31, and referring to Figure 3, it will be seen that the partitions are hollow and each has a thick marginal portion to which a disk or plate 34 is secured by screws 34' and forms a removable wall for a chamber 35 in the partition. Impellers or beaters 36 operate in the chambers 32 and each has a hub 37 from which extend longitudinally curved blades 38. The hubs are formed with internal keys 39 which fit into keyways or grooves 40 formed in the shaft 22 so that the impellers turn with the shaft and outer ends of the blades are beveled so that they have close fitting engagement with the annular walls of the chambers. It should also be noted that the impellers fit snugly in the chambers 32 between side walls thereof but that sufficient clearance is provided between the section 25 and the hub bearing against the same to allow material to be forced from the pocket 24 into the first chamber 32 during operation of the homogenizer.

During operation of the reactor a refrigerant such as cold water or a heating medium such as hot water must be passed through the partitions in order to chill or heat the material being treated. Therefore, there has been provided inlet and outlet pipes 41 and 42. These pipes extend longitudinally of the cylinder through openings 43 and 44 formed in the sections. The pipes have ports 45 and 46 formed therein in such positions that the register with ports or side openings 47 and 48 leading from the openings 43 and 44 and communicating with lower and upper portions of the chambers 37. When a supply pipe is connected with the pipe 41 and a return pipe connected with the pipe 42, the cooling or heating medium may enter lower portions of the chambers 36 and flow upwardly through these chambers to upper portions thereof and out through the pipe 42. This flow of a cooling or heating medium will cause the material forced through the chambers 32 and the tubes 33 to be kept at either low or high temperature and the material will enter the pocket 49 leading from the front chamber 32 at the desired temperature. The fact that the material being treated passes through the small tubes 33 from one chamber 32 to another also aids in effecting a good mixture of solid and liquid or gaseous matter. While three cooling or heating chambers have been shown, any number desired may be provided.

From the pocket 49, the material passes through an opening 50 into the discharge chamber 28. This opening 50 is surrounded by a valve seat 51 against which bears a homogenizing valve 52, the valve being slidably mounted in a sleeve 53 which projects outwardly from the head 18 at the front end of the cylinder. A cap 54 carrying a diametrically extending turning bar 55 is screwed upon the sleeve for adjustment thereon and this cap engages the outer end of a helical spring 56 which extends longitudinally in the sleeve with its inner or front end bearing against the valve and disposed about a guide pin 57 projecting from the valve. When the cap is turned it will be shifted longitudinally upon the sleeve and tension of the spring adjusted so that the amount of pressure applied by the spring to the valve will be controlled. It will thus be seen that retarding action of the valve will be adjusted and a desired homogenizing action obtained as the material is forced through the pocket and past the valve into the discharge chamber 28 from which the homogenized material flows through the outlet 29. A pointer 58 carried by the cap projects from the inner end thereof towards scale markings 59 arranged in a circular path on the head 18 about the sleeve 53 so that an operator having charge of the machine may accurately determine the setting of the valve and make note of the same for future reference when again using the machine for treatment of material.

In Figures 8 through 17, there has been shown a reactor of modified construction. In this embodiment of the invention, the cylinder has a main section 61, front and rear sections 62 and 63 defining chambers 64 and 65 through which a refrigerant or hot water flows, a section 66 forming a discharge chamber 67, and front and rear heads 68 and 69. The chamber 64 in section 62 is closed by a plate or disk 70 which is removably secured by screws 71 and the chamber 65 of the rear section 63 is closed by the head 69, all of the sections being secured in assembled relation to each other by tie rods 72. A neck 69' connects the rear head 69 with a pump 73 having a shaft 74 which passes through the neck and into the casing at one side of the neck is an inlet 75 through which material to be treated enters the neck. This material passes from the neck through the center opening 76 of the section 63 into the casing and after being treated is delivered into the discharge chamber 67 from which it is discharged through the outlet 76. A partition plate 77 is mounted in the casing and is held in spaced relation to the front head 68 by pins 78, and through this plate are formed openings 79 which are spaced from each other circumferentially of the plate as shown in Figure 10. The plate constitutes a wall for a chamber 80 from which leads a pocket 81 disposed centrally of the section 62, and at one point about its periphery the plate is formed with a notch or recess 82 disposed at the inner end of a neck 83. Stationary stators 84 and 85 are mounted in the casing about the shaft in spaced relation to each other and each has a hub and a rim and spokes 86 extending between the hub and the rim and disposed at a transverse incline, as shown in Figures 14 and 15. There have also been provided impellers or beaters 87, 88 and 89 which are mounted upon the shaft in co-operating relation to the stators and turn with the shaft. The arms or blades of the beaters are curved longitudinally and have their outer ends disposed close to the wall of the casing and upon referring to Figures 11, 12 and 13, it will be seen that the blades of the impellers 87 and 89 curve towards the left when viewed, as shown in these figures, whereas the blades of the impeller 88 curve towards the right. The curvature of the blades and the transverse pitch or incline of the spokes causes a very good mixing action to take place while material is being forced through the casing from the inlet end thereof to the outlet chamber.

The material flows from the pocket 81 into the discharge chamber 67 through an opening 90 surrounded by a valve seat 91 against which bears a valve 92. This valve is slidably mounted in a sleeve 93 upon which a cap 94 is screwed, the cap having engagement with the outer end of a helical spring 95 which urges the valve towards the valve seat. The cap is turned by means of its handle 96 and by noting the position of the pointer 97 relative to the scale markings 98 arranged in a circular path about the neck pressure applied to the valve by the spring may be accurately adjusted.

Instead of forming the impellers with solid arms or blades they may be formed, as shown in Figures 16 and 17, wherein the blades 99 of the impeller 100 have been each shown formed with a plurality of openings 101 spaced from each other longitudinally of the blades. Impellers formed, as shown in Figures 16 and 17 serve to completely associate or mix either metered or pre-mixed material that enters through the pump section and there pass through to the end of thoroughly associating compatible or incompatible products, so that when it passes through the homogenization there is a complete uniformity in percentage relation of the material being processed.

Instead of cooling or heating the material as it moves from one impeller to another the material treated in this specific form of reactor is only cooled when first entering the casing and while passing from the chamber 80 and through the pocket 81 into the discharge chamber 67. Cooling is effected by a refrigerant, such as cold water, and heating by means of hot water, or its equivalent, and referring to Figure 8, it will be seen that the cold or hot water flows through the chambers 64 and 65 of the sections 62 and 63. The water is delivered into the chambers of these sections through feed pipes 102 and is discharged therefrom through pipes 103.

The operation of the modified form of reactor is the same as in the form previously described and, therefore, it is not thought necessary to repeat the description thereof.

From the foregoing description of the construction and operation of my invention, the method of applying same to use will be readily understood and it will be seen that I have provided a comparatively simple, inexpensive and efficient means for carrying out the various objects of the invention.

While I have particularly described the elements best adapted to perform the functions set forth, it is apparent that various changes in form, proportion and in the minor details of construction may be resorted to, without departing from the spirit or sacrificing any of the principles of the invention.

Having thus described the invention, what is claimed is:

1. A reactor comprising a cylindrical casing having an inlet at its rear end and an outlet at its front end, a partition providing an outlet chamber in the forward portion of said casing, baffles in said casing spaced from each other longitudinally of the casing, and each provided with a multiplicity of transversely spaced tubes passing through it a shaft rotatably mounted in the casing longitudinally thereof and through centers of said baffles, beaters carried by said shaft and fitting snugly between the baffles and turning with the shaft, and having movement across ends of said tubes during turning of the beaters with the shaft, said partition being formed with a passage opening into the discharge chamber, a homogenizer valve controlling flow of material into the discharge chamber through said passage and urged towards a closed position.

2. A reactor comprising a casing having an inlet at one end, a partition in said casing dividing the casing into a main chamber with which the inlet communicates and a discharge chamber provided with an outlet, baffles in the main chamber spaced from each other longitudinally thereof, and each provided with a plurality of tubes communicating with space between the baffles, beaters movably mounted in co-operating relation to said baffles and moving across ends of the tubes when in motion, passages being provided for circulation of a heat exchange medium during movement of material being treated through the casing between the inlet and the outlet, and a homogenizer valve urged towards a closed position and automatically shifted towards an opened position by action of material moving through the casing toward the outlet.

3. A reactor comprising a casing having a cylindrical body and front and rear heads for the body, there being a partition in the body defining a discharge chamber and a main chamber, the main chamber having an inlet and the discharge chamber having an outlet, said partition being formed with a pocket at its center leading from the main chamber and with an opening leading from the pocket to the discharge chamber, the opening being surrounded by a valve seat confronting the discharge chamber, the front head being formed with an opening at its center aligned with the pocket and surrounded by a sleeve projecting outwardly from the said head, a homogenizer valve slidable longitudinally through said sleeve and extending into the discharge chamber with its inner end confronting the valve seat, a spring in said sleeve bearing against the valve, a cap screwed upon said sleeve and having a head at its outer end engaging and applying pressure to the outer end of the spring to tension the spring and thereby cause the valve to be urged towards a closed position against the valve seat, and beaters movably mounted in the main chamber for operating upon material forced through the casing between the inlet and the outlet.

4. A reactor comprising a cylindrical casing having a body and heads closing ends of the body, said body consisting of a plurality of sections having marginal portions secured in face to face engagement with each other and forming an annular wall for the body, one section constituting a partition dividing the body into a main chamber and a discharge chamber, other ones of the sections forming baffles spaced from each other longitudinally of the body, the discharge chamber having an outlet, the main chamber being provided with an inlet at the other end of the body from the discharge chamber, said partition being formed with an opening surrounded by a valve seat and through which material passes from the main chamber into the discharge chamber, a rotary shaft extending into the main chamber centrally thereof and through certain of the baffles, beaters mounted upon the shaft to turn therewith in co-operating relation to the baffles, and a homogenizer valve yieldably held in closing engagement with the valve seat.

5. A reactor comprising a cylindrical casing having a body and heads closing ends of the body, said body consisting of a plurality of sections having marginal portions secured in face to face engagement with each other and forming an annular wall for the body, one section constituting a partition dividing the body into a main chamber and a discharge chamber, other ones of the sections forming baffles spaced from each other longitudinally of the body, the discharge chamber having an outlet, the main chamber being provided with an inlet at the other end of the body from the discharge chamber, said partition being formed with an opening surrounded by a valve seat and through which material passes from the main chamber into the discharge chamber, said baffles being hollow and carrying tubes passing through the baffles transversely thereof, a rotary shaft extending into the casing centrally of the main chamber and through certain of the baffles, beaters carried by said shaft in co-operating relation to the baffles and each having a hub fitting about the shaft and turning therewith and carrying blades, the blades being curved longitudinally and having side edge faces in face to face engagement with side faces of the baffles, and a homogenizer valve yieldably held in a closed position against the valve seat.

6. A reactor comprising a cylindrical casing having a body and heads closing ends of the body, said body consisting of a plurality of sections having marginal portions secured in face to face engagement with each other and forming an annular wall for the body, one section constituting a partition dividing the body into a main chamber and a discharge chamber, other ones of the sections forming baffles spaced from each other longitudinally of the body, the discharge chamber having an outlet, the main chamber being provided with an inlet at the other end of the body from the discharge chamber, said partition being formed with an opening surrounded by a valve seat and through which material passes from the main chamber into the discharge chamber, said baffles being hollow tubes carrying tubes passing through the baffles transversely thereof, a rotary shaft extending into the casing centrally of the main chamber and through certain of the baffles, beaters mounted upon said shaft to turn therewith and having blades spaced from each other circumferentially of the shaft and having side faces in close contacting engagement with side faces of the baffles, and a homogenizer valve yieldably held in a closed position against the valve seat.

7. A reactor comprising a cylindrical casing having a body and heads closing ends of the body, said body consisting of a plurality of sections having marginal portions secured in face to face engagement with each other and forming an annular wall for the body, one section constituting a partition dividing the body into a main chamber and a discharge chamber, other ones of the sections forming baffles spaced from each other longitudinally of the body, the discharge chamber having an outlet, the main chamber being provided with an inlet at the other end of the body from the discharge chamber, said partition being formed with an opening surrounded by a valve seat and through which material passes from the main chamber into the discharge chamber, said baffles being hollow and carrying tubes passing through the baffles transversely thereof, a rotary shaft extending into the casing centrally of the main chamber and through certain of the baffles, beaters mounted upon said shaft to turn therewith and having blades spaced from each other circumferentially of the shaft and movement across ends of the tubes during rotation of the beaters, a homogenizer yieldably held in closed position against the valve seat, and pipes communicating with space within the hollow baffles for passage of a heat exchange medium through the baffles to control the temperature of material passing through the casing during operation of the reactor.

JOHN MARCO.

REFERENCES CITED

The following references are of record in the file of this patent:

UNITED STATES PATENTS

| Number | Name | Date |
|---|---|---|
| 1,000,641 | Tebbit | Aug. 15, 1911 |
| 1,372,172 | Larsen | Mar. 22, 1921 |
| 1,435,464 | Grindrod | Nov. 14, 1922 |
| 1,924,080 | Gram | Aug. 22, 1933 |
| 1,975,631 | Bonfield | Oct. 2, 1934 |
| 2,124,580 | Lavine | July 26, 1938 |
| 2,169,338 | Ditto | Aug. 15, 1939 |